United States Patent [19]

Osaka

[11] Patent Number: 5,628,054
[45] Date of Patent: May 6, 1997

[54] PORTABLE RADIO APPARATUS HAVING BATTERIES FOR SUPPLYING A PLURALITY OF VOLTAGES

[75] Inventor: Masahiko Osaka, Tokyo, Japan

[73] Assignee: NEC Corporation, Tokyo, Japan

[21] Appl. No.: 298,424

[22] Filed: Aug. 31, 1994

[30] Foreign Application Priority Data

Aug. 31, 1993 [JP] Japan ............................ 5-239082

[51] Int. Cl.⁶ .................................................. H04B 1/40
[52] U.S. Cl. ............................ 455/89; 455/127; 455/343
[58] Field of Search ............................ 455/89, 127, 343, 455/347–349; 307/18, 48; 429/99

[56] References Cited

U.S. PATENT DOCUMENTS

| 4,345,286 | 8/1982 | Kanayama et al. ............... 307/18 |
| 5,036,532 | 7/1991 | Metroka et al. .................. 455/89 |
| 5,149,985 | 9/1992 | Fujiwara ........................... 307/48 |
| 5,164,652 | 11/1992 | Johnson et al. .................. 455/89 |

FOREIGN PATENT DOCUMENTS

| 0340794 | 11/1989 | European Pat. Off. . |
| 2239567 | 7/1991 | European Pat. Off. . |
| 0525298 | 2/1993 | European Pat. Off. . |
| 62-232222 | 10/1987 | Japan . |
| 4-271235 | 9/1992 | Japan ........................... 307/48 |
| 0540605 | 2/1973 | Switzerland . |
| 2242083 | 9/1991 | United Kingdom . |

*Primary Examiner*—Chi H. Pham
*Attorney, Agent, or Firm*—Sughrue, Mion, Zinn, Macpeak & Seas

[57] ABSTRACT

A portable radio communication apparatus has a main unit and a detachable and chargeable battery pack. The main unit has a power amplifier (power module) for sending out high frequency power to a whip antenna for transmitting/receiving use and a transmit/receive signal processing section for signal processing in transmission and reception. The battery pack further has a nickel hydride battery of a layered structure, which is low in internal resistance and outputs a high voltage, for supplying power to the transmission power amplifier which consumes a large current, and a low-voltage lithium ion battery, which is high in internal resistance, for supplying power to the transmit/receive signal processing section which consumes a relatively small current. This configuration makes unnecessary the otherwise required stabilizing circuit for supplying a low voltage to the transmit/receive signal processing section. At the same time, the voltage fluctuations of the nickel metal hydride battery when the power amplifier begins transmission or at any other time would not affect the voltage from the lithium ion battery.

6 Claims, 4 Drawing Sheets

5,628,054

PORTABLE RADIO APPARATUS HAVING BATTERIES FOR SUPPLYING A PLURALITY OF VOLTAGES

BACKGROUND OF THE INVENTION

The present invention relates to a portable radio apparatus, and more particularly to a portable radio communication apparatus for supplying a plurality of circuits including a large current consuming circuit with optimal power for the operation of each from a plurality of types of batteries.

A conventional radio apparatus has a main unit and a pack of chargeable batteries, which serves as power source for the main unit. The main unit has a power amplifier for supplying high frequency power to a whip antenna and a transmit/receive signal processing section for processing transmit signals and receive signals. The battery pack has built-in nickel cadmium (Ni-Cd) batteries or nickel metal hydride (Ni-MH) batteries.

The main unit and the battery pack have a detaching mechanism, which allows them to be detached when the batteries are to be charged and to be put together again when the charging is completed. The main unit and the battery pack respectively have power input terminals and power output terminals, which come into contact with each other when the two units are joined. In such a portable radio apparatus, when the operating voltage is to be supplied to the power amplifier and the transmit/receive signal processing section of the main unit, the circuit operation may be adversely affected by any voltage fluctuation. For instance, if the voltage of the Ni-Cd batteries has fallen to a certain prescribed low level, the transmit/receive signal processing section will still operate normally, but the power amplifier may not, failing to supply the required transmitting power. Or, when the power amplifier does operate, i.e. at the time of transmission, if a large current will flow to invite a substantial voltage drop, the transmit/receive signal processing section may be prevented from normal operation. For this reason, batteries of a relatively high-voltage, which is needed to obtain transmitting power efficiently, are used, and at the same time there is provided a stabilizing circuit for converting this high voltage to a low voltage required for the operation of the transmit/receive signal processing section. Furthermore, where the circuitry of the apparatus is complex, a large number of stabilizing circuits are needed to supply a stabilized voltage to each processing circuit.

Another known such apparatus according to the prior art is described in the Gazette of the Patent Laid-open No. 2322222 of 1987. The apparatus disclosed in this gazette is provided with a control unit for the transmission output for detecting the source voltage that is supplied and sending out the optimal transmission power on the basis of the voltage. However, this transmission output control unit, like the conventional circuit first mentioned, also involves the problem of complex circuitry.

SUMMARY OF THE INVENTION

An object of the present invention is to obviate the aforementioned disadvantages, and provide a portable radio communication apparatus for supplying a plurality of circuits including a large current consuming circuit with optimal power for the operation of each from a plurality of types of batteries.

A portable radio communication apparatus according to the invention is provided with a first battery, which is low in internal resistance and outputs a high voltage, for supplying a large current consuming circuit with power for its optimal operation. The apparatus also includes a plurality of second batteries, which are high in internal resistance and output low voltages, for supplying each of a plurality of small current consuming circuits with power for its optimal operation.

In such a configuration, the large power consuming circuit is the transmission power amplifier, for which a nickel metal hydride battery is used as the first battery, and the small power consuming circuits constitute the transmit/receive signal processing section, for which lithium ion batteries are used as the plurality of second batteries.

In this configuration, furthermore, the first battery, the plurality of the second batteries, the transmission power amplifier, and the transmit/receive signal processing section can be housed in a single box.

The first battery and the plurality of second batteries may be housed in a single battery box, and the transmission power amplifier and the transmit/receive signal processing section may be housed in a main unit box; the battery box and the main unit box are detachably connected by a freely detaching mechanism; power output terminals connected to the first battery and the plurality of second batteries are provided within the battery box; there are further provided power input terminals which are connected to the transmission power amplifier and the transmit/receive signal processing section within the main unit box and are in contact with the power output terminals.

In addition to these configurations, there may further be provided a charging current supply source for supplying charging currents to the first battery and the plurality of second batteries, a voltage detecting circuit for detecting the voltages at which the first battery and the plurality of second batteries are being charged, and a charging current stop control circuit for stopping the supply of charging currents to ones among the first battery and the plurality of second batteries for which the completion of charging has been detected by the voltage detecting circuit.

In a portable radio communication apparatus according to the present invention having the above-described configuration, the transmission power amplifier consuming a large current is supplied with power for its optimal operation by a nickel metal hydride battery which is low in internal resistance and outputs a high voltage, and each of the plurality of transmit/receive signal processing circuits consuming small currents is supplied with power for its optimal operation by a lithium ion battery which supplies a low voltage. Moreover, the nickel metal hydride battery and the lithium ion batteries are discriminatively charged. Therefore, each circuit is supplied with optimal power for its operation, and enabled to operate stably.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 1:
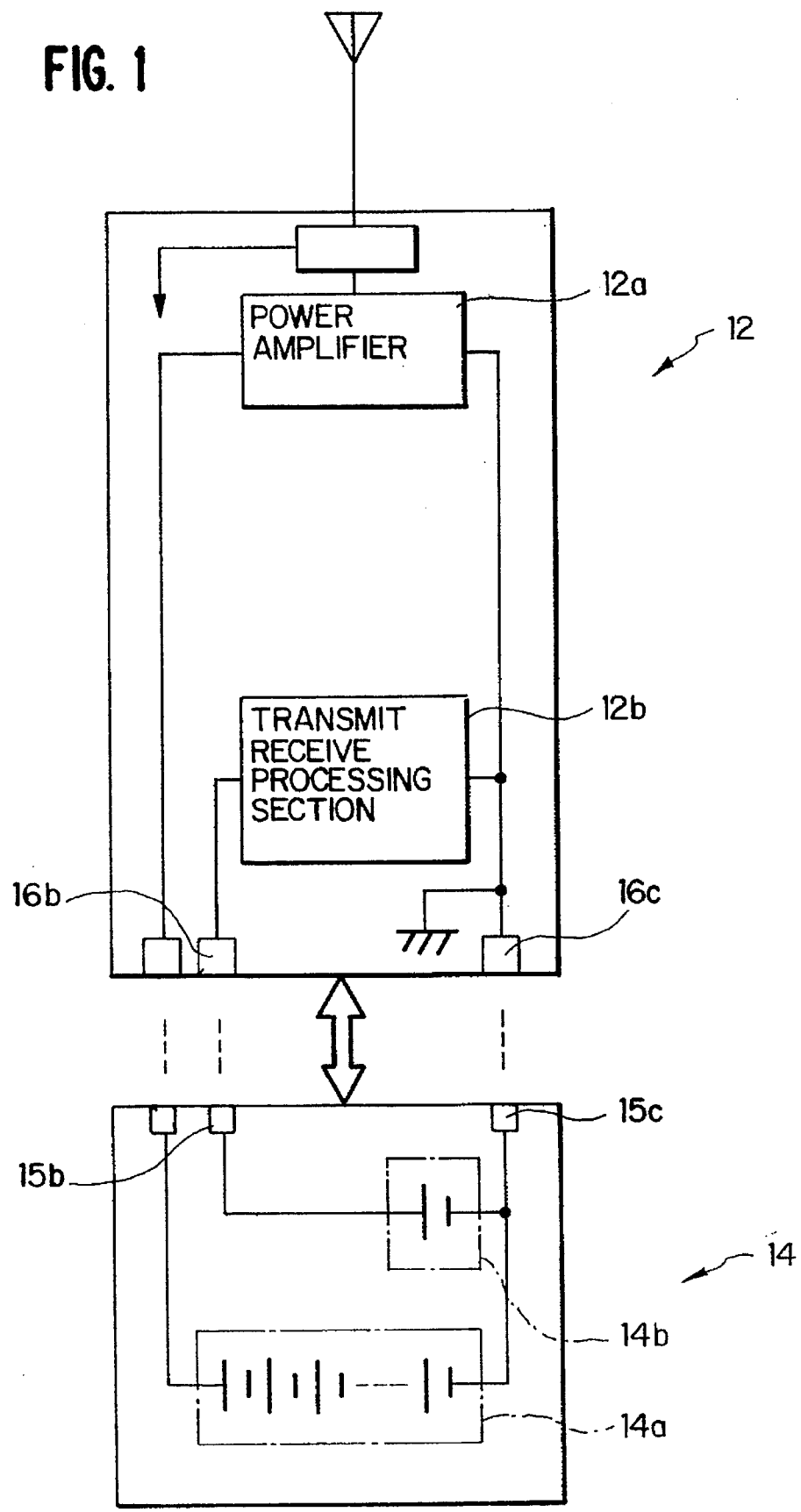
FIG. 1 is a block diagram illustrating a first preferred embodiment of the invention.

Referring to FIG. 1, a portable radio communication apparatus according to the present invention has a main unit 12 and a chargeable battery pack 14, which serves as the power source to and is detachable from the main unit 12. The main unit 12 further has a power amplifier (power module) 12a for sending out high frequency power to a whip antenna for transmitting/receiving use and a transmit/receive signal processing section 12b for signal processing in transmission and reception.

The battery pack 14 further has a nickel metal hydride battery 14a of a layered structure, which is low in internal resistance and outputs a high voltage, for supplying power to the transmission power amplifier 12a which consumes a large current, and a low-voltage lithium ion battery 14b, which is high in internal resistance, for supplying power to the transmit/receive signal processing section which consumes a relatively small current.

The main unit 12 and the battery pack 14 are detached from each other when the batteries are to be charged, and put together again upon completion of charging, with a detaching mechanism not shown. The battery pack 14 is provided with power output terminals 15a and 15b for connection to the plus (+) terminals of the nickel metal hydride battery 14a and the lithium ion battery 14b within and a power output terminal 15c for connection to the minus (−) terminals of the nickel metal hydride battery 14a and the lithium ion battery 14b.

The main unit 12 is provided with power input terminals 16a, 16b and 16c in positions respectively corresponding to the power output terminals 15a to 15c of the battery pack 14, i.e. such positions as come into contact with the power output terminals 15a to 15c when the main unit 12 is fitted to the battery pack 14. The power input terminal 16a is connected to the voltage supply end of the power amplifier 12a. The power input terminal 16b is connected to the voltage supply end of the transmit/receive signal processing section 12b, and the power input terminal 16c is connected to the grounding end of the power amplifier 12a and of the transmit/receive signal 12b.

Next will be described the operation of the apparatus in the configuration of this first preferred embodiment.

The connection of the power output terminals 15a and 15c to the power input terminals 16a and 16c, respectively, causes a large current of a high voltage to be supplied from the nickel metal hydride battery 14a in the battery pack 14 to the power amplifier 12a.

On the other hand, the connection of the power output terminals 15b and 15c to the power input terminals 16b and 16c, respectively, causes a small current of a low voltage to be supplied from the lithium ion battery 14b in the battery pack 14 to the transmit/receive signal processing section 12b.

Since the power amplifier 12a is thus supplied with a large current of a high voltage from the nickel metal hydride battery 14a whose internal resistance is low, it can efficiently obtain the needed transmission power. A low voltage is supplied to the transmit/receive signal processing section 12b from the lithium ion battery 14b, which is separate from the nickel metal hydride battery 14a.

This arrangement makes unnecessary the otherwise required stabilizing circuit for supplying a low voltage to the transmit/receive signal processing section 12b. Moreover, the voltage fluctuations of the nickel metal hydride battery 14a when the power amplifier 12a begins transmission or at any other time would not affect the voltage from the lithium ion battery 14b. In other words, the voltage supplied to the transmit/receive signal processing section 12b is not varied by any operation of the power amplifier 12a, and both the power amplifier 12a and the transmit/receive signal processing section 12b can operate stably.

Next will be described a second preferred embodiment of the present invention. In this second embodiment is additionally provided another lithium ion battery for supplying an intermediate voltage between the two batteries of the first embodiment, i.e. the nickel metal hydride battery 14a for supplying a large current of a high voltage and the low voltage lithium ion battery 14b.

Figure 2:
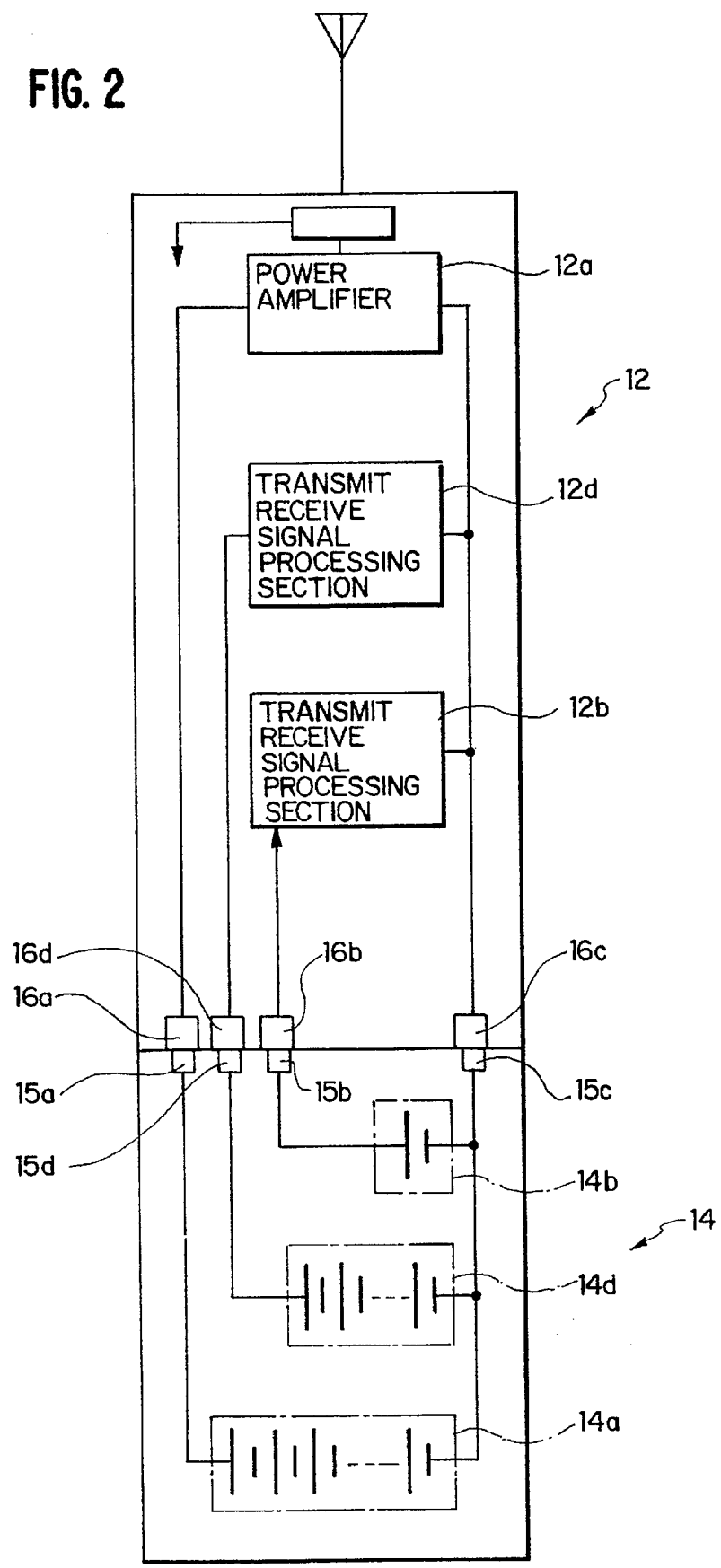
FIG. 2 is a block diagram illustrating a second preferred embodiment of the invention.

FIG. 2 is a block diagram illustrating the configuration of the second preferred embodiment.

The embodiment shown in FIG. 2 is provided, in addition to the configuration of the first embodiment illustrated in FIG. 1, in its main unit 12 with another transmit/receive signal processing section 12d, which operates at a higher voltage than the transmit/receive signal processing section 12b, besides the power amplifier 12a and the transmit/receive signal processing section 12b. Furthermore, the battery pack 14 is provided with another lithium ion battery 14d for supplying power to the transmit/receive signal processing section 12d in addition to the nickel metal hydride battery 14a and the lithium ion battery 14b. The lithium ion battery 14d supplies an intermediate voltage lower than the voltage of the nickel metal hydride battery 14a and higher than that of the lithium ion battery 14b.

The battery pack 14 is further provided with a power output terminal 15d which supplies the intermediate voltage and is connected to the plus (+) terminal of the lithium ion battery 14d in addition to the power output terminals 15a and 15b and the power output terminal 15c to be connected to the minus (−) terminal, which constitute the same configuration as the corresponding parts of the first embodiment. The main unit 12 is provided with a power input terminal 16d to be connected to the power supply end of the transmit/receive signal processing section 12d besides the power input terminals 16a to 16c, which have the same configuration as in the first embodiment.

Next will be described the operation of the apparatus in the configuration of this second preferred embodiment.

The connection of the power output terminals 15a and 15c to the power input terminals 16a and 16c, respectively, causes a large current of a high voltage to be supplied from the nickel metal hydride battery 14a in the battery pack 14 to the power amplifier 12a. On the other hand, the connection of the power output terminals 15b and 15c to the power input terminals 16b and 16c, respectively, causes a small current of a low voltage to be supplied from the lithium ion battery 14b in the battery pack 14 to the transmit/receive signal processing section 12b. Furthermore, the connection of the power output terminals 15d and 15c to the power input terminals 16d and 16c, respectively, causes an intermediate voltage to be supplied from the lithium ion battery 14d in the battery pack 14 to the transmit/receive signal processing section 12d.

In the second embodiment, the power amplifier 12a is thus supplied with a large current of a high voltage from the nickel metal hydride battery 14a whose internal resistance is low, and a low voltage is supplied to the transmit/receive signal processing section 12b from the lithium ion battery 14b. Furthermore, since an intermediate voltage is supplied from the lithium ion battery 14d to the transmit/receive processing section 12d, the required transmission power can be obtained efficiently as in the first embodiment and, moreover, the voltage fluctuations of the nickel metal hydride battery 14a when the power amplifier 12a begins transmission or at any other time would not affect the voltages from the lithium ion batteries 14b and 14d, resulting in stable operation.

Next will described a third preferred embodiment of the present invention.

Figure 3:
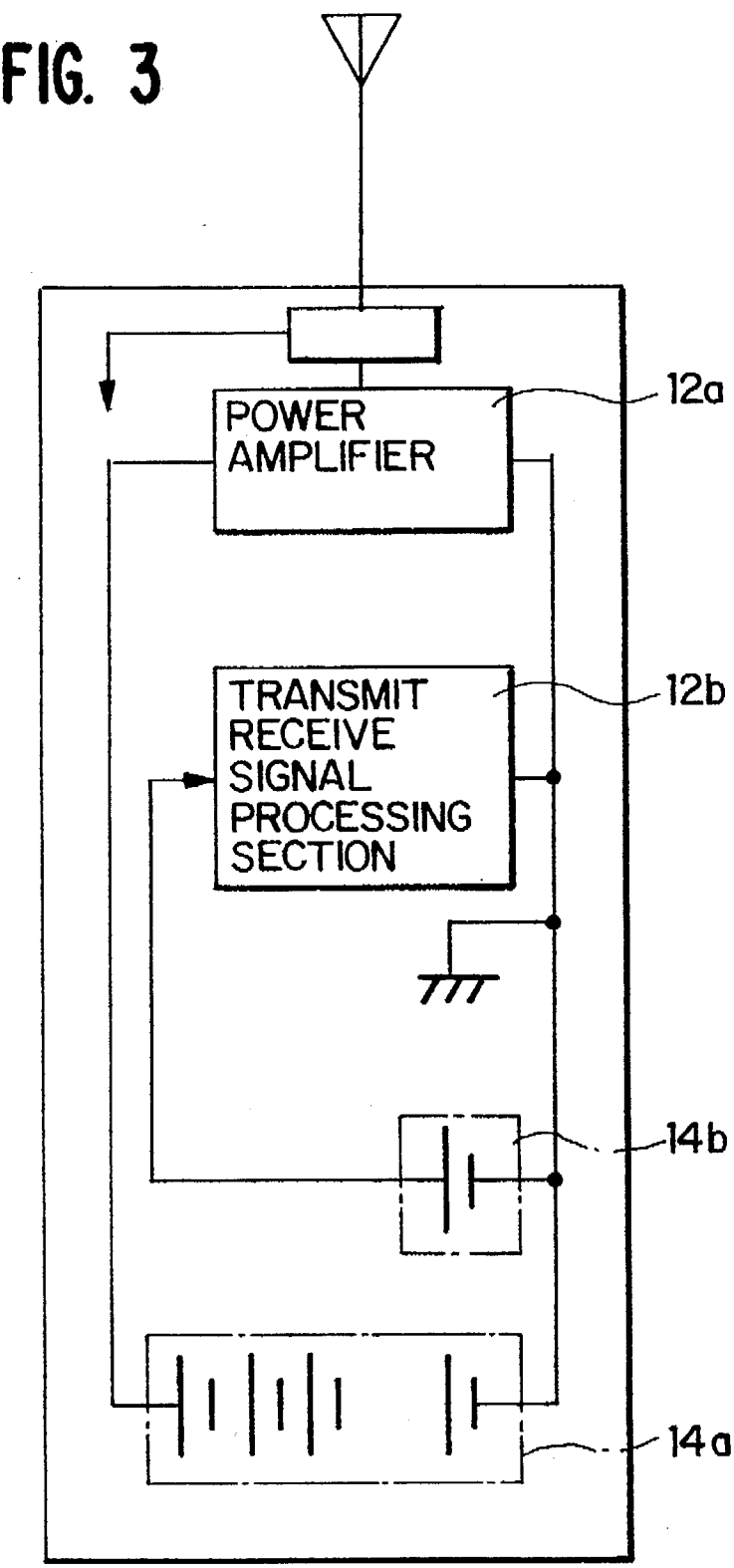
FIG. 3 is a block diagram illustrating a third preferred embodiment of the invention.

FIG. 3 is a block diagram illustrating the configuration of the third preferred embodiment.

In the embodiment shown in FIG. 3, the main unit 12 and the battery pack 14 in the first embodiment illustrated in FIG. 1 are integrated instead of being structured separately. Its operation is the same as that of the first embodiment. In this case, there is the advantage of facilitating size reduction. The second embodiment, i.e. the configuration using three batteries, would also permit similar integration, and in this case, too, there is the advantage of facilitating size reduction.

Figure 4:
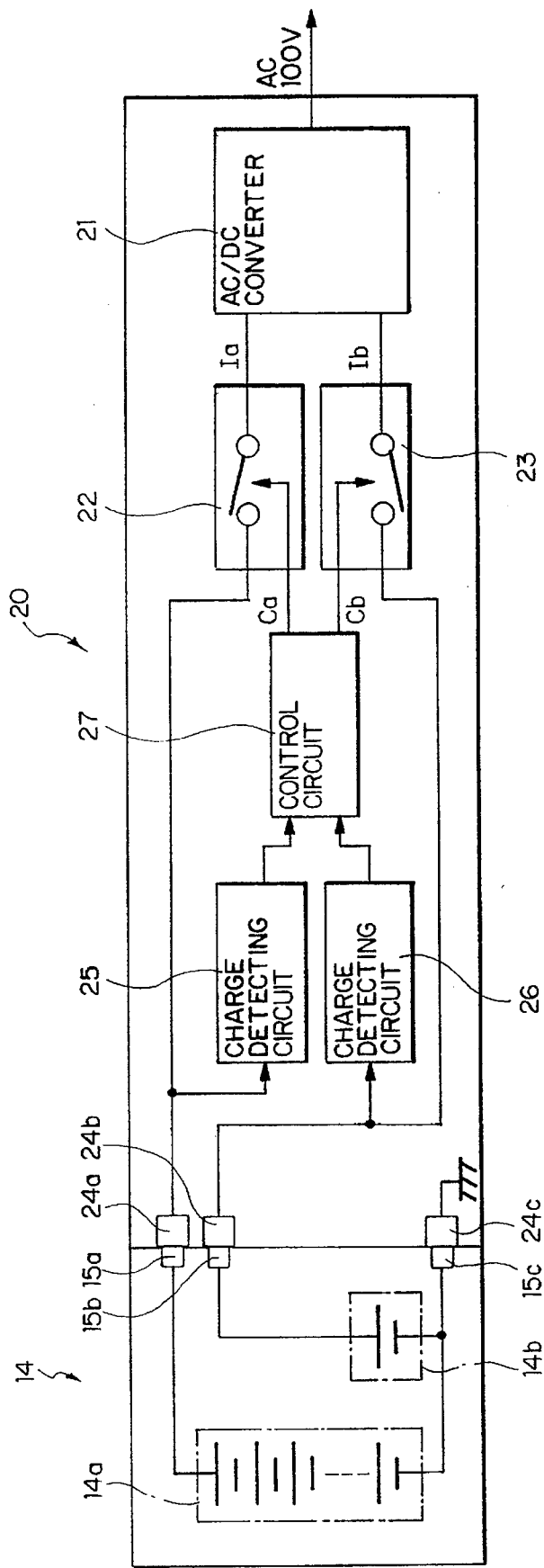
FIG. 4 is a block diagram illustrating the configuration of the charger.

FIG. 4 is a block diagram illustrating the configuration of a charger.

A charger 20 shown in FIG. 4 is intended to change the lithium ion batteries 14b and 14d and the nickel metal hydride battery 14a in the battery pack 14 illustrated in FIG. 1 or FIG. 3. The following description will refer only to a case in which two batteries in the battery pack 12, the nickel metal hydride battery 14a and the lithium ion battery 14b, are charged.

This charger 20 has an AC/DC converter 21 for converting an alternating current of 100 V into direct currents suitable for a plurality of batteries to be charged, e.g. constant currents Ia and Ib; switches 22 and 23 for turning on and off to supply, or stop the supply of, the direct currents Ia and Ib with control signals Ca and Cb, respectively; and power input terminals 24a, 24b and 24c to come into contact with the power output terminals 15a to 15c, respectively, of the battery pack 14.

It further has charge detecting circuits 25 and 26 for detecting through the power input terminals 24a, 24b and 24c the voltages of the nickel metal hydride battery 14a and the lithium ion battery 14b, respectively, in the battery pack 14; and a control circuit 27 for turning on and off the switches 22 and 23 in accordance with the voltages detected by these charge detecting circuits 25 and 26.

Next will be described the operation of this charger.

At the time of starting the charging, the control signals Ca and Cb from the control circuit 27 turn on the switches 22 and 23, respectively, and the direct currents Ia and Ib from the AC/DC converter 21 are supplied to the power input terminals 24a and 24b, respectively. This supply of the direct currents Ia and Ib causes, through the power output terminals 15a and 15b which are in contact with the power input terminals 24a and 24b, the nickel metal hydride battery 14a and the lighium ion battery 14b, respectively, in the battery pack 14 to be charged, and their voltages rise. These voltage rises are detected by the charge detecting circuits 25 and 26.

For instance, a voltage lower by 0.1 V than the maximum voltage is detected as a charge-completed voltage. On the basis of this detected voltage, the switches 22 and 23 are turned off in response to the control signals Ca and Cb from the control circuit 27 to stop the supply of the direct currents Ia and Ib from the AC/DC converter 21. Incidentally, as the nickel metal hydride 14a and the lithium ion battery 14b differ in the length of charging time, the switches 22 and 23 are not turned off simultaneously.

What is claimed is:

1. A portable radio communication apparatus comprising:

a main body having a large current consuming circuit and a small current consuming circuit, and a battery pack for supplying said main body with voltages it requires, said battery pack including a first battery, which is low in internal resistance and which outputs a high voltage, for supplying said large current consuming circuit with power for its optimal operation, and a second battery, which is high in internal resistance and which outputs a low voltage, for supplying said small current consuming circuit with power for its optimal operation.

2. A portable radio communication apparatus, as claimed in claim 1, wherein said large power consuming circuit is a transmission power amplifier, for which a nickel metal hydride battery is used as said first battery, and said small power consuming circuit is a transmit/receive signal processing section, for which a lithium ion battery is used as said second battery.

3. A portable radio communication apparatus, as claimed in claim 2, wherein said first and second batteries, said transmission power amplifier, and said transmit/receive signal processing section are housed in a single box.

4. A portable radio communication apparatus, as claimed in claim 2, wherein said first battery and second batteries are housed in a single battery box, and said transmission power amplifier and transmit/receive signal processing section are housed in a main unit box; the battery box and the main unit box are detachably connected by a freely detaching mechanism; power output terminals connected to the first and second batteries are provided within the battery box; and there are further provided power input terminals which are connected to the transmission power amplifier and the transmit/receive signal processing section within the main unit box and are in contact with said power output terminals.

5. A portable radio communication apparatus, as claimed in claim 1, further provided with a charging current supply source for supplying charging currents to said first and second batteries, voltage detecting means for detecting the voltages at which said first battery and second batteries are being charged, and charging current stop control means for stopping the supply of charging currents to the first and second batteries for which the completion of charging has been detected by said voltage detecting means.

6. A portable radio communication apparatus, as claimed in claim 1, wherein said first and second batteries simultaneously supply power to said large current consuming circuit and to said small current consuming circuit, respectively.

* * * * *